March 28, 1944.  F. J. SODAY  2,345,013
PROCESS FOR CONDUCTING EXOTHERMIC POLYMERIZATION REACTIONS
Filed June 23, 1939  4 Sheets-Sheet 1

Inventor
Frank J. Soday
By Hugo C. Kennan
Attorney

March 28, 1944. F. J. SODAY 2,345,013
PROCESS FOR CONDUCTING EXOTHERMIC POLYMERIZATION REACTIONS
Filed June 23, 1939 4 Sheets-Sheet 4

Inventor
Frank J. Soday
By Hugo A. Kemman
Attorney

Patented Mar. 28, 1944

2,345,013

UNITED STATES PATENT OFFICE 2,345,013

PROCESS FOR CONDUCTING EXOTHERMIC POLYMERIZATION REACTIONS

Frank J. Soday, Upper Darby, Pa., assignor to The United Gas Improvement Company, a corporation of Pennsylvania Application June 23, 1939, Serial No. 280,724

13 Claims. (Cl. 18—57)

This invention pertains generally to methods for effecting polymerization.

More particularly, this invention pertains to methods of the foregoing character wherein there are obtained polymerization products of high purity, free from discoloration, and in forms convenient for subsequent commercial use. This is accomplished, generally speaking, by effecting the polymerization in thin sheets or films while employing various means for the control of the temperature of the polymerization reaction.

The preparation of resins, plastics, and polymeric compounds in general by the polymerization or co-polymerization or condensation of reactive organic compounds or mixtures of reactive compounds, by the application of heat or by the use of various catalysts, or by the use of catalysts and heat together, is well known to the art.

Resins or plastics are commonly prepared from reactive organic compounds by adding the reactive material, or mixture of reactive materials, to a suitable vessel and conducting the polymerization or condensation process therein.

There are a number of disadvantages present in such processes of effecting polymerization.

Among such disadvantages may be mentioned the inferior quality of products which are obtained by reactions which are exothermic in nature. In such reactions, it is generally necessary to initially heat the materials to be reacted in order to start the reaction. Once started, however, the reaction frequently proceeds vigorously and with the evolution of heat, and, generally, the temperature of the reaction mass becomes so high that the resultant product is discolored or is formed with bubbles of gas entrapped therein. Furthermore, products produced under such conditions are likely to be deficient in other respects, such, for example, as possessing a relatively low molecular weight, and the like.

Since polymerization reactions are for the most part exothermic while condensation reactions are for the most part endothermic, it will be apparent that the processes herein described are generally applicable for polymerization reactions.

In the description and claims which follow, however, the term polymerization is intended to additionally embrace those condensation reactions which are exothermic in nature, and the term polymer is intended to embrace products of such condensation reactions.

Although the production of satisfactory polymers has been effected upon a laboratory scale, it has not been feasible to carry on large-scale commercial production of many of such polymers due to the deficiencies above mentioned.

In laboratory production, the ratio between the volume of the reactants (and hence the quantity of heat evolved during the reaction) and the surface of the reaction flask (which usually serves as the cooling surface) is quite small.

However, in large-scale commercial equipment, the ratio of the volume of reactants to the exposed surface of the reaction vessel is quite large; the heat liberated during the course of the reaction cannot be adequately dissipated through the walls of the reaction vessel, thus causing the temperature of the reaction mixture to become unduly high.

It will thus be seen that products of inferior quality are produced when laboratory methods are carried over into large-scale production.

In many instances, it is desirable to utilize resins and plastics in the form of thin films or sheets. Polymerized resins are frequently used in sheet form as a substitute for glass and, in film or sheet form, as an intermediate layer in non-shatterable or laminated glass. Additionally polymerized resins are often dissolved in solvents or oils, in order that dyes, pigments, fillers, plasticizers, or other softening agents may be added, the solvent being subsequently removed from the blended resinous material, if desired. Solution of polymerized resins is facilitated if such resins are prepared in thin film form. The initial production of polymerized products in thin film form is, therefore, of commercial importance.

Generally speaking, one of the features of this invention is the polymerization of reactive organic materials in sheet or foil form under carefully controlled temperature conditions.

Among others, one such method of effecting the desired control of a polymerization reaction is to flow the reactive organic materials onto a moving surface, such as a drum or a metallic belt, and after polymerization has been effected, stripping from the moving surface the polymer product.

Polymerization in sheet or film form not only provides products in a useful form, but additionally affords adequate heat control, thus resulting in the production of polymers free from discoloration, entrapped gas bubbles, and other of the above-mentioned defects.

By permitting the reactants to combine in the form of relatively thin layers or films, exothermic reactions can be maintained within desired temperature levels. The relatively short distance between any portion or zone of the reaction mixture or product and the metallic or other surface through which the temperature is to be controlled, off-sets the poor thermo-conductivity of the reaction mixture or the resinous product.

The thickness of the polymerizing layers or films employed may be varied over very wide limits depending, among other things, upon the nature of the reactant or mixture of reactants employed, or upon the quantity of heat generated or absorbed by the reactant or reactants during the course of the desired reaction. However, layers with a thickness in excess of one inch are rarely employed. Very good results may be obtained by the use of layers with a thickness of less than one-half inch, and in the case of pronounced exothermic reactions, layers of only a few thousandths of an inch in thickness may be used.

By effecting polymerization in a continuous or semi-continuous manner, the product obtained is of a uniform nature. Relatively wide strips or sheets of the polymer product may be prepared and may be continuously collected on a storage roll.

Further features of the invention reside in the steps, combination of steps, and sequences of steps, all of which, together with other features, will become more apparent to persons skilled in the art as the specification proceeds and upon reference to the drawings in which:

Figure 1:
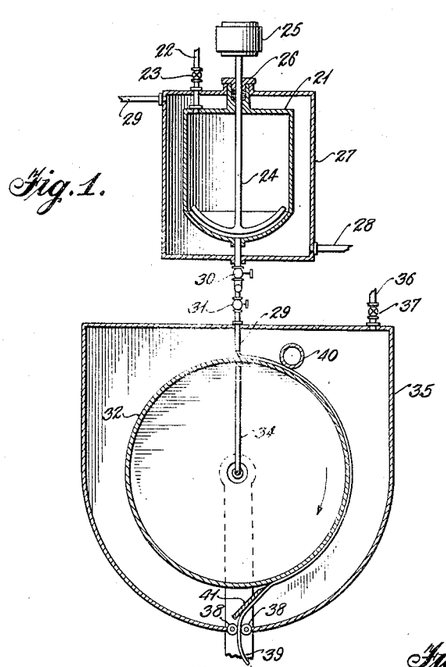
Figure 1 is a vertical sectional view of one form of apparatus for carrying out the invention.
Figures 2, 3:
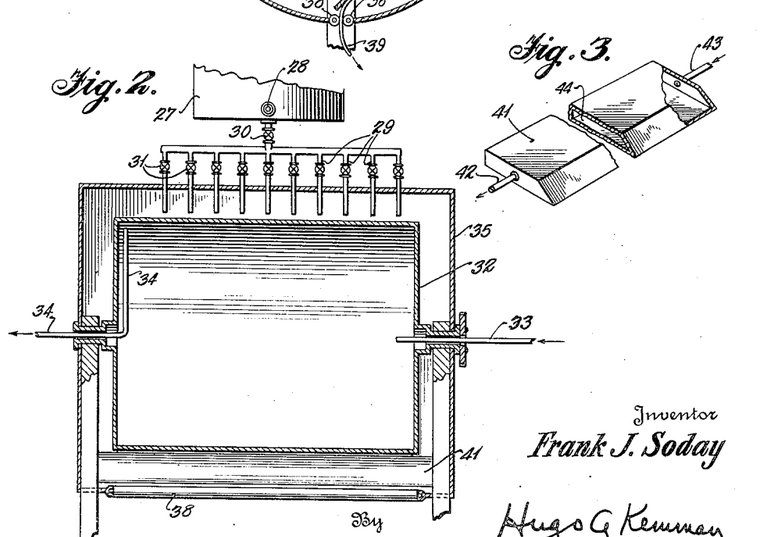
Figure 2 is a vertical sectional view of the apparatus shown in Figure 1, taken at right angles to that of Figure 1.
Figure 3 is a perspective view partly broken away of one form of a scraper which may be used to remove the thin film from a drum or belt.

Referring now to Figures 1 and 2, at 21 is shown a mixing chamber in which reactants, charged through line 22, controlled by valve 23, may be thoroughly mixed by means of stirrer 24, operated by motor 25 or similar device. A stuffing box 26 may be provided if desired in order to prevent contamination of the mixture of the reactants by exposure to the atmosphere.

There may, of course, be more than one charging line 22 in case it is desired to simultaneously add the reactants to mixing chamber 21.

The temperature of the mixture of reactants may be controlled, if desired, suitably by the use of a heating or cooling chamber 27 having inlet and outlet pipes 28 and 29.

It may also be unnecessary to utilize a heating and cooling chamber 27 depending upon the nature of the reactants and the temperature at which reaction is initiated.

The temperature control chamber 27 may, of course, be replaced by any suitable heat exchange means, such, for example, as a heating or cooling coil surrounding the mixing chamber 21.

The mixture of reactants may be distributed by means of suitable discharge lines or vents 29 controlled by valves 30 and 31 to the surface of a revolving drum 32, the temperature which may be maintained at any desired level by the circulation through the drum of a liquid or gas introduced through line 33 and withdrawn through line 34.

Transfer of the reactants from the mixing chamber 21 to the drum 32 upon which the reaction is carried out may be effected by any suitable means.

For example, in place of the discharge line 29 the reactants may be distributed upon the surface of the drum by forcing the material under pressure through suitable spray heads, screens, or nozzles, or by permitting it to flow through suitable screens or other distributing devices by means of gravity, or the like.

Drum 32 is illustrated as being surrounded by a chamber 35 in order that the reaction may be carried on in an inert atmosphere if desired. Line 36 may be provided with valve 37 for the introduction of such an inert atmosphere.

The chamber 35 may be equipped with rollers 38 between which the reaction products 39 may be withdrawn.

Within the chamber 35 and positioned adjacent the drum 32 may be a suitable leveling device such as roll 40 which may be employed to form a film of uniform thickness from the reactants supplied to the drum by distributing means 29.

In place of the leveling roll 40, a leveling bar may be used in order to ensure an even layer of the reaction mixture over the surface of the drum if desired.

The leveling roll 40 may be placed at any point between the point of application of the reaction mixtures and the point of removal of the reaction products, although it is preferred to locate this device reasonably close to the point of application of the reaction mixture.

If desired, additional rolls may be positioned about the drum 32 in order to make more uniform the thickness of the resulting reaction products.

Also positioned within the chamber 35 may be a blade or scraper 41 to remove the reaction products 39 from the drum 32.

The reaction product may be stripped from the reaction drum 32 at any point around its circumference depending upon the speed of reaction and the rate of rotation of the drum.

The scraper 41 may be cooled or heated by suitable means if desired.

One method of effecting a cooling or heating of scraper 41 is shown in Figure 3 illustrating means by which a gas or liquid of the desired temperature may be introduced through line 43 and withdrawn through line 42, passing through the interior chamber 44 of the scraper 41.

The reaction between the reactants upon the surface of the drum 32 may be brought about by controlling the temperature of the surface of this drum. The reactants combine to form a product in the form of a thin sheet or film, which may be stripped from the drum 32 by the scraper 41 and withdrawn from the chamber 35 between the rolls 38, which serve to retain the desired atmosphere within such chamber.

As has been shown in Figures 1 and 2, the temperature of the drum 32 may be maintained at any desired level through the introduction of a fluid heating or cooling medium within the rotating drum. The lines 33 and 34 entering the drum 32 axially of the drum are preferably fixed to prevent rotation thereof but may be positioned within the drum in any desired manner to effect the desired degree of heating or cooling.

For example, among other arrangements, line 33 may be extended upward and horizontally positioned under the uppermost surface of drum 32, with perforations therein in order to permit close control of the temperature at the point where the reactants are applied to the drum, if desired.

The position of the withdrawal line 34 may be varied in order to control the level of the liquid or the path taken by the fluid stream within the drum.

The reaction time can be varied within very wide limits by varying the diameter of the drum 32 and/or its rate of rotation.

Figure 4:
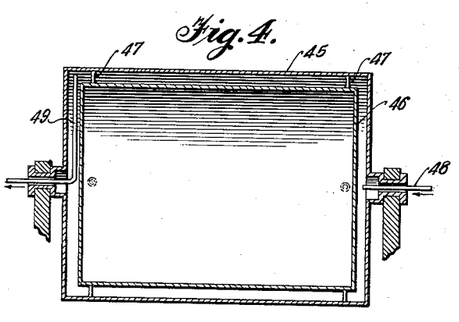
Figure 4 is a sectional elevation showing another modification of the drum shown in Figures 1 and 2.
Figure 5:
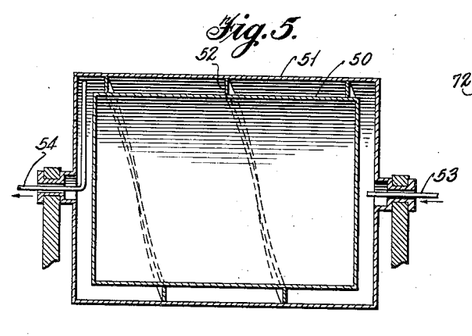
Figure 5 is a vertical sectional view of a further modification of the drum shown in Figure 4.
Figure 6:
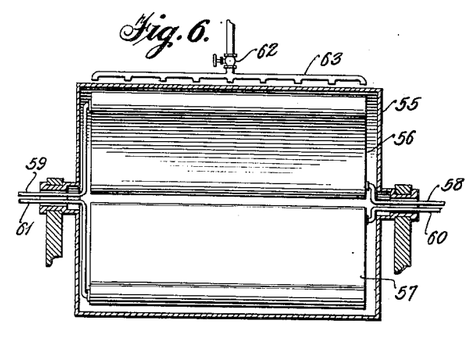
Figure 6 is an elevation, partly in section, illustrating a further modification of the apparatus shown in Figures 1 and 2.

Various modifications of the structure of drum 32 of Figures 1 and 2 are shown in Figures 4, 5, and 6.

Referring to Figure 4, in order to reduce the volume of gas or liquid which may be circulated within the drum for temperature control purposes, there may be constructed within the drum 45 upon the surface of which the reaction is effected, a hollow inner shell or drum 46 attached, for example, to the outer drum by means of straps 47 or other suitable means. There is thus formed two concentric drums between which the temperature regulating gas or liquid streams introduced by line 48 must pass before being discharged from the drum by means of line 49.

It will thus be seen that not only may the volume of temperature regulating gas or liquid be greatly reduced but also it may be more evenly distributed over the inner surface of the polymerizing drum.

A further modification of the structure of the polymerizing drum is shown in Figure 5 wherein the inner drum 50 may be fastened to the outer drum 51 by means of a relatively thin metallic spiral 52. This not only serves to fasten together the two drums but also serves to conduct the temperature regulating stream from the end of the unit, where it may be introduced, through line 53 to the opposite end of the unit, where it may be withdrawn through line 54. By this means, an even distribution of the temperature regulating gas or liquid streams over the inner surface of the outer drum may be maintained.

Figure 7:
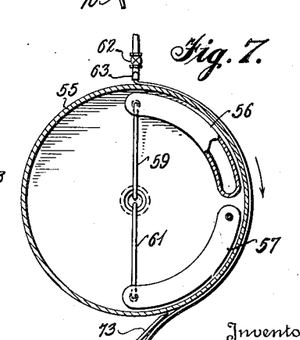
Figure 7 is a sectional elevation (shown broken) of the modification shown in Figure 6, taken at right angles thereto.

A further method of conducting reactions of this general class, illustrated in Figures 6 and 7, may consist of a single rotating shell or drum 55 containing stationary heating or cooling sections 56 and 57 adjacent the surface of the drum 55.

In one method of operation of the apparatus shown in Figures 6 and 7, a heating medium may be introduced to heating section 56 through line 58 and withdrawn therefrom through line 59 while a cooling medium may be introduced to cooling section 57 through line 60 and withdrawn through line 61.

In such a modification, it will be observed that the heating and cooling sections 56 and 57 may be fixed in position and that the drum 55 upon the surface of which the reaction may be effected rotates over the heating and cooling sections.

The reactant, or mixture of reactants, flows from the mixing or storage vessel through a control device 62 and a suitable system of distributing units 63 onto the surface of the rotating reaction drum 55. The reaction mixture may first be heated to the desired reaction temperature by means of the stationary heating sections 56 located near the inner surface of the drum 55 at this point, after which the temperature of the material may be maintained or cooled to the desired level by means of the stationary cooling section 57.

The reaction product may then be stripped from the drum 55, by any suitable means, such as the scraper 73.

A multiple system of reacting drums may also be used to effect the desired control of the temperature of reaction.

Any number of drums may be used in any suitable arrangement.

Certain of these drums may be heated to the desired extent, while the remainder of the drums may be cooled or maintained at the desired reaction temperature in order to obtain a product of desired characteristics.

By the use of a proper number of rolls or drums, and by the use of the proper temperature in each unit of the system any desired heating and/or cooling cycle may be employed.

Figure 8:
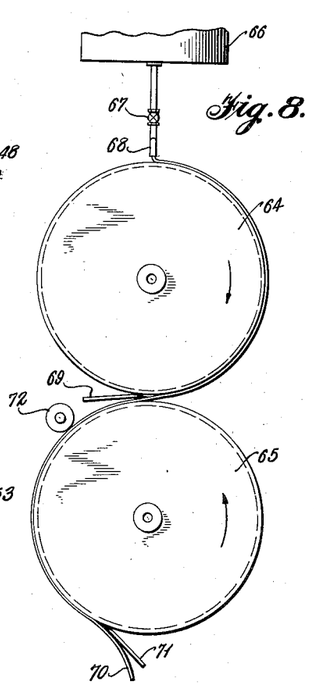
Figure 8 is an elevational view diagrammatically illustrating a manner of coupling several drums into a single system.

A unit of this type is illustrated in Figure 8. It may consist of two drums, one of which, 64, may be used to maintain the reaction mixture at the desired reaction temperature while the other, 65, may be used to moderate the reaction and/or to cool the product to the desired extent.

The reaction mixture or reactant flows from the mixing or storage vessel 66 through a control device 67 and a suitable system of distributing units 68 onto the surface of the reaction drum 64 which may be maintained at the desired temperature.

The reaction mixture or product may be removed from the reaction drum 64 by means of a suitable blade or scraper 69 which may also serve to transfer the materials to the surface of the cooling drum 65, the temperature of which may be maintained at the proper level to moderate or complete the reaction and/or to cool the reaction mixture or product. The reaction product 70 in the form of a thin film or sheet may be removed from this drum by means of secondary blade or scraper 71.

The blades or scrapers 69 and 71 may also be heated to aid in the removal of the material from the surface of the drums, or they may be cooled in order to reduce the temperature of the reaction mixture or product to the desired extent, in any suitable manner, such, for example, as the method described in connection with Figure 3 above.

A leveling device, such, for example, as the roll 72 shown in Figure 8 may be employed immediately below the blade or scraper 69 located between the drums or rolls in order to prevent the material or product from sticking to the blade or scraper and to force it to adhere more firmly to the cooling drum 65 and to thus insure good transfer between this material and the cooling drum or roll.

Figures 9, 12:
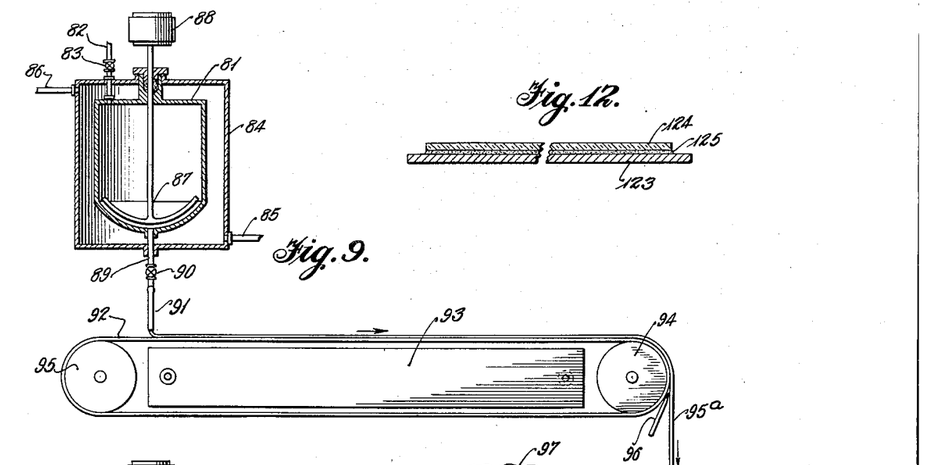
Figure 9 is a central vertical elevational view, shown partly in section, illustrating another modification of the apparatus shown in Figures 1 and 2.
Figure 12 is a sectional view in detail of the belt and product produced by the apparatus shown in Figure 10.

A further modification of this invention is shown in Figure 9 where polymerization may be effected upon the surface of an endless moving belt passing over a suitable temperature control section.

In Figure 9, 81 designates a mixing chamber into which the reactants may be introduced through charging line 82 controlled by valve 83. The temperature of the reacting mixture may be maintained within the desired limits, suitably by the use of a heating or cooling chamber 84. Alternatively, this may be effected by means of heating or cooling coils if desired (not shown). Suitable heating or cooling fluids, either gaseous or liquid may be introduced through line 85 and withdrawn through line 86.

When a single reactant is being employed to form the reaction product by simple polymerization, no stirring means need be provided within the mixing chamber 81. However, when a mixture of reactants is being employed, a stirrer 87 operated by motor 88 may be provided to insure complete blending of the various constituents.

From the mixing chamber 81 the reactant mixture may be distributed by means of discharge line 89, control valve 90, and distributing means 91 onto the surface of the endless moving strip or belt 92 where the reaction may be effected. The reaction mixture may be maintained at the desired temperature during the course of the reaction by means of a temperature-regulating section 93. The endless moving belt 92, which may be of metal or other material, passes over rolls 94 and 95 at either end of the unit.

From the endless moving belt, the reaction product 95a may be stripped by means of the blade or scraper 96, which may be constructed as shown and described in connection with Figure 3 above, if desired.

The nature and extent of the reaction effected upon the endless moving belt 92 may be controlled if desired by varying the length of the reaction zone, the size of the temperature regulating section 93 and the rate at which the endless moving belt passes over the temperature regulating section.

Figures 10, 11:
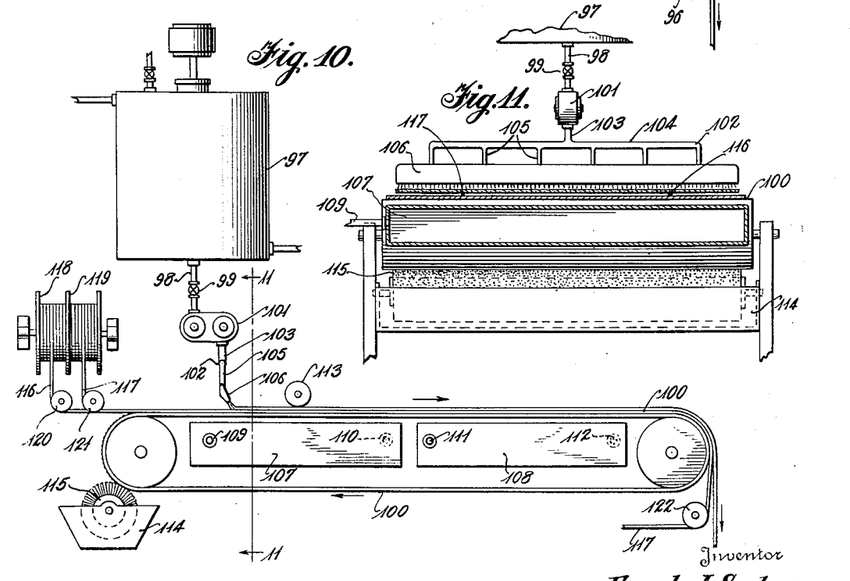
Figure 10 is an elevational view of a further modification of the apparatus shown in Figures 1 and 2.
Figure 11 is a section on lines 11—11 of Figure 10.

A further modification of the apparatus shown in Figure 9 is shown in Figures 10 and 11.

In this modification of the apparatus which may be employed to effect the process contemplated by this invention, the reactants discharged from the mixing vessel enclosed in the heating or cooling chamber 97, by means of discharge line 98 and control valve 99, may be forced onto the surface of an endless moving belt or the like, 100, by means of the pump 101 and the distributing means 102.

Various distributing means may be used, but that shown in Figures 10 and 11 consists of a feed line 103 from the pump 101, a header 104, distributing feed line 105 and a distributing reservoir 106 extending transversely across the endless moving belt 100. The distributing reservoir 106 may be provided with a perforated bottom plate through which the reacting materials may be applied to the endless moving belt 100 under pressure from the pump 101.

The endless moving belt upon which the reaction mixture may be applied by means of the distributing means 102, passes over temperature-regulating sections 107 and 108. In each of these temperature-regulating sections, the temperature may be maintained at the desired level by means of a fluid, liquid, or gas, which may be introduced and withdrawn from the temperature regulating section by means of lines 109, 110, 111, and 112.

In temperature-regulating section 107, the temperature may be maintained at the point at which the reaction is initiated, while the temperature-regulating section 108 may be maintained at the temperature level necessary to effect cooling or solidification of the resulting reaction product.

A suitable leveling device such as the leveling roll 113 may be utilized to uniformly distribute the reaction mixture in order to secure a sheet or film of reaction product which is of uniform thickness.

Certain resinous materials will be found to adhere quite strongly to the metallic or other surfaces upon which the polymerization is conducted. This may be prevented by the use of certain agents which serve as an interlayer between the resinous material and the polymerizing surface. The use of certain powders or other finely divided material will be found to be suitable for this purpose.

Included among the materials which may be utilized to prevent sticking of the resinous products upon the metallic belt may be mentioned asbestos, talc, cloth or leather findings, gypsum, silica, sand, wood flour, mica, zinc dust, and other finely divided organic or inorganic materials. If desired, these may be subsequently removed from the finished product either by mechanical means or by other suitable means. On the other hand, it may be desired to utilize the finished product without removing these materials.

The use of certain waxes, oils, resinous materials, or liquids in general may also be effective in specific cases. Materials which may be used for this purpose include carnauba wax, paraffin, mineral oil, glycerine, petroleum jelly, or the like. These may be removed from the product by suitable methods if desired, or they may be left with the product to serve as plasticizers, softening agents, and the like.

The method of application of the various materials employed to prevent the reaction product from adhering too strongly to the metallic surface upon which it is formed may vary within wide limits.

Among other such methods, that shown in Figure 10 may be utilized. The vessel 114 contains one of the materials herein enumerated which may be utilized to prevent sticking or the like. Rotating in part within the vessel may be a roller brush 115 suitably connected by driving means to the mechanism which drives endless moving belt 100 over the temperature-regulating sections 107 and 108. In operation, roller brush 115 contacts not only the materials contained in vessel 114 to be applied to the reaction surface, but also contacts the reaction surface at some point prior to the application thereto of the reacting materials.

Figure 12 is a cross sectional view showing a resinous product 124 separated from the metallic reaction surface 123 by means of any of the aforementioned suitable materials illustrated by 125.

Another suitable method of removing the resinous material from the surface upon which it has been polymerized consists of placing metallic strings, wires, strands, strips, mesh, or screen upon the metallic surface prior to the polymerizing process, either continuously or semi-continuously, followed by the removal of these objects and the simultaneous removal of the reaction product at the end of the process. In place of metallic objects or devices of this type, similar objects or devices fabricated from other materials, such as organic fibers, either natural or artificial, may also be used. Such objects or devices may be removed from the finished material if desired, or it may be left incorporated with the material to serve various specific purposes.

As one modification of the many methods by which the resinous product may be removed from the reactive surface, Figures 10 and 11 illustrate the use of metallic wires 116 and 117 fed from spools 118 and 119 over pulleys 120 and 121 onto the endless moving belt prior to the application thereto of the reacting materials. After the reaction product has been stripped from the moving belt at the opposite end of the reaction process, the metallic wires 116 and 117 may be removed from the reacting product in some suitable manner such as by passing over pulley 122, and either rewound upon empty spools for reuse or returned directly to the pulleys 120 and 121 for continuous use.

In place of the metallic wires shown in Figures 10 and 11, it will be apparent that continuous or semi-continuous strips of various materials may also be used for this purpose. Among such materials may be mentioned paper, cardboard, cloth, canvas, wood strips, metallic strips, and metallic foil.

These materials may be removed from the finished product if desired or they may be left with the finished product for some specific purpose, such as, for example, the preparation of laminated wood, laminated cardboard, or laminated or interlayered materials in general including laminated cloth.

On the other hand, chilling the resin to cause it to become brittle and crack as the result of the scraping action, or as the result of bending such as in passing around a pulley, may be employed to remove the resin from the various surfaces. Chilling may be accomplished by any suitable means, such as by a blast of refrigerated air, etc.

Figures 13, 15:
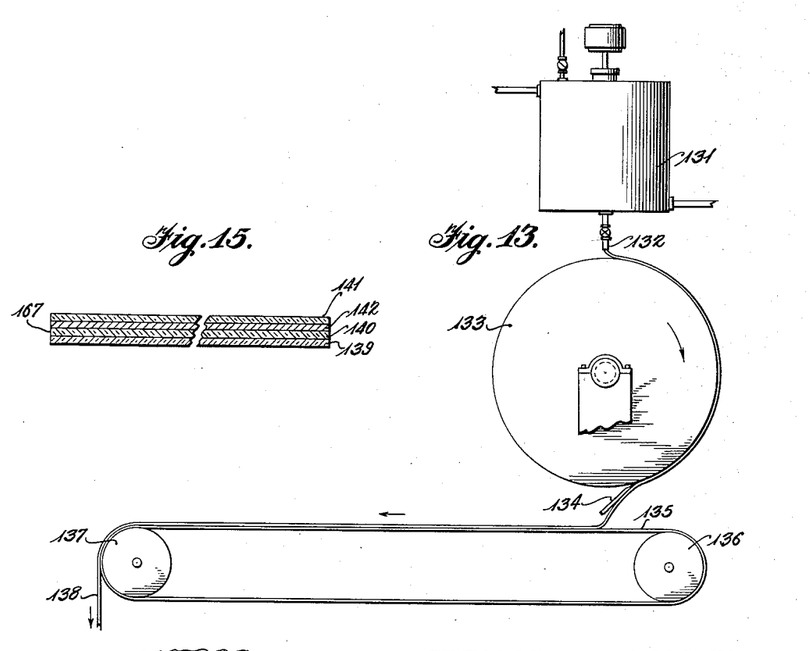
Figure 13 is an elevation showing the combination of a drum and a belt to produce products in accordance with this invention.
Figure 15 is a sectional view of a laminated resinous product produced by the apparatus shown in Figure 14.

An alternative method of effecting polymerization in accordance with this invention is shown in Figure 13.

The reacting materials charged from a mixing chamber enclosed within a heating or cooling chamber 131 may be delivered by any suitable distributing means 132 upon the surface of a rotating drum 133 maintained at the desired temperature level in any suitable manner as hereinbefore described. The reaction product, either partially or completely polymerized may be stripped from the drum 133 by the blade or scraper 134 and the reaction continued, or the reaction product solidified upon the endless moving belt 135 passing over the wheels 136 and 137. From the moving belt 135, the reaction product 138 in the form of thin sheets or films of reaction product may be stripped by any of the foregoing methods as desired.

Further modifications of this invention reside in the use of a multiple series of two or more moving belts, or of any combination of drums and belts, as may be desired to effect control of exothermic reaction to any desired degree with any variation or combination of reactants.

The foregoing processes for effecting polymerization in thin film form may also be utilized for the production of resinous products consisting of multiple layers.

Figure 14:
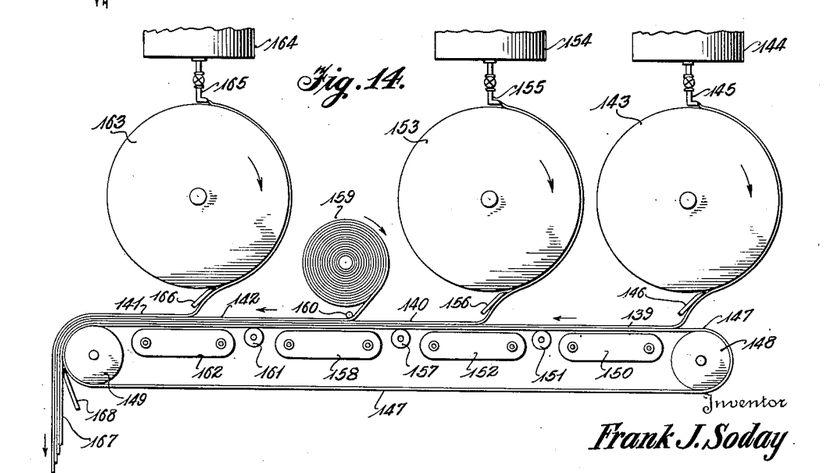
Figure 14 is an elevational view showing a further possible combination of a multiple series of drums with a belt.

Among other methods by which multiple layered products may be formed is that shown in Figure 14, the resultant product of which is shown in cross section in Figure 15.

Such laminated products may consist of two or more layers of the same or different resins and may be formed with or without various fillers, binders, or other materials.

In Figure 14, there is illustrated the formation of a laminated product consisting of three resinous layers, two of which are separated by an additional material which may be paper, cloth, canvas, metallic foil, or any such suitable material.

In accordance with this modification of the present invention, layers 139, 140, and 141 may be resinous materials, while layer 142 may be a continuous strip of some suitable material, such as cloth or the like.

Resinous layer 139 may be produced upon the reaction drum 143 upon which the reacting materials have been fed from jacketed mixing vessel 144 through distributing means 145. The resinous polymer thus produced may be stripped from the reaction drum 143 by the blade or scraper 146 and fed to an endless moving belt 147 passing over rolls 148 and 149. The resinous product 139 may be carried by the endless moving belt 147 over a heating or cooling section 150 where it may be heated or cooled to the desired consistency or the reaction may be either accelerated or retarded as desired.

The movement of the moving belt 147 carries the reaction product 139 over supporting roller 151 and over the heating or cooling section 152 where a second layer, 140, of resinous product prepared upon the surface of reaction drum 153 may be applied on the surface thereof. The reaction product produced upon the surface of drum 153 may be identical with or different from that produced upon the reaction drum 143. The reacting materials for the production of resinous product 140 may be fed upon the surface of reaction drum 153 from the jacketed mixing vessel through suitable distributing means 155, and may be removed from drum 153 by a blade or scraper 156, as previously described herein.

By means of the heating or cooling section 152 over which both resinous products 139 and 140 pass, any desired union of these two materials may be effected.

By movement of the endless belt 147 the combined resinous products 139 and 140 may be led over supporting roll 157 and passed over heating or cooling section 158 at which point the cloth filler 142 fed from roll 159 over roller 160 may be applied. Through proper control of the temperature of the heating or cooling section 158 proper union of the cloth filler with the joined resinous products 139 and 140 may be effected.

Further movement of the endless belt 147 now carries the triple layered material over supporting roll 161 and over heating or cooling section 162, at which point resinous layer 141 may be applied on the surface of the cloth filler 142. The resinous layer 141 may be formed upon the reaction surface of the drum 163 from reacting materials supplied from jacketed mixing chamber 164 through distributing means 165. The resinous product 141 thus formed on the surface of the reaction drum 163 may be stripped therefrom by means of blade or scraper 166.

By means of control of the temperature of heating or cooling section 162, union between the resinous material 141 and the laminated material consisting of cloth filler 142 and the resinous layers 140 and 139, may be effected.

The four-ply laminated product 167, shown in section in Figure 15, may then be stripped from the surface of the moving belt 147 in any suitable manner as, for example, the blade or scraper 168.

It will be apparent that numerous modifications of the above described procedures may be utilized within the scope of this invention. Among such modifications may be mentioned the following.

Although in general the apparatus hereinbefore described is utilized to effect complete polymerization, partial polymerization may be effected by use of the apparatus described, the partially polymerized material obtained being further polymerized by the application of heat and/or catalysts in other suitable containers or vessels. The further polymerization may be effected either with or without the addition of other reactants to the mixture and with or without the addition or use of fillers, pigments, plasticizers, solvents, or the like.

Alternatively, the reaction may be partially completed before the material is delivered to any of the polymerizing devices herein described.

In addition to the foregoing methods shown for cooling the resinous polymer or stopping the polymerization reaction, the reaction may be stopped and/or the reaction product cooled to the desired extent by discharging the reaction product into a cooling bath or atmosphere subsequent to its removal from the drum or belt.

The reaction may also be carried out in an inert atmosphere or in an atmosphere of any desired gas, or in a vacuum, or under pressure, by placing any of the reaction units shown in a suitable container or enclosure similar to that represented by chamber 35 in Figures 1 and 2.

In order to prevent the reaction mixture or reaction product from flowing over the edge of the metallic surface upon which the polymerization is effected, this surface, either of the drum or of the metallic belt may be flared at its edges thus providing a dish-like structure to confine the reaction mixture or the reaction product.

When the polymerization reaction is effected upon a flexible metallic belt, the belt may be utilized as a flat belt during a portion of the polymerization cycle, and its edges turned upward through other portions of the cycle suitably by the use of rollers, wheels, or other devices.

The polymerizing processes hereinbefore described may also be used for the preparation of continuous or semicontinuous strips or foils, the reaction product being removed from the polymerizing surface intact, after which it may be subdivided into suitable sections.

Sections of the polymerizing product may be stretched or worked in any desired manner in order to improve their mechanical properties. Among other ways, this may be done by affixing the material to a moving belt, wheel, or roll as it is discharged from the polymerizing surface and prior to subdivision, and operating the belt, wheel or roll at a speed somewhat greater than that of the polymerizing device.

On the other hand the product may be stretched transversely, that is in width, by suitable devices such as those used in the textile industry for stretching cloth to the desired width.

Both types of stretching or working may be employed if desired.

The various units hereinbefore described may be constructed from metals or other suitable materials. Any desired metal may be used for this purpose depending upon the nature of the reactants and/or products. Suitable metals include, among others, steel, stainless steel, aluminum, copper, brass, tin plate, zinc coated metals, chromium coated metals, nickel silver, nickel, chromium, and various other alloys or metals.

Catalysts may be used in conjunction with any of the polymerizing methods herein described, either with or without the simultaneous use of heat.

The procedure hereinabove outlined may be used for the polymerization of any reactive compound or mixtures of compounds, either with or without the application of heat and/or catalysts.

The process is especially applicable for the production of resinous or plastic materials such, for example, as those of the maleic anhydride-unsaturated compound type, or the polyvinyl type, for instance, the polystyrol type.

Illustrative of the maleic anhydride-unsaturated compound type of resins which may be formed in accordance with the teachings of this invention may be mentioned resins produced by the reaction between maleic acid or anhydride, fumaric acid, itaconic acid, citraconic acid, phenyl-maleic acid, benzyl-maleic acid, ethyl-maleic acid, dibenzyl-maleic acid, or the anhydrides thereof, or other derivatives thereof, such as an ester or an acid chloride, or any mixture containing two or more of these compounds, and compounds containing a single reactive double bond, or a non-conjugated system of reactive double bonds, such as olefines including indene, styrene, methyl styrene, isobutylene, and cyclopentene, olefine derivatives such as hydroxy styrene, acrylic acid, esters of acrylic acid, and derivatives of acrylic acid and acrylic acid esters, methacrylic acid and methacrylic acid esters, unsaturated aldehydes such as acrolein, croton aldehyde, or furfuraldehyde, vinyl derivatives, such as vinyl chloride, vinyl acetate, vinyl ethers, vinyl esters in general, or derivatives thereof, polyvinyl derivatives, unsaturated ketones such as vinyl methyl ketone, coumarone, cinnamic acid and/or esters or derivatives thereof, or any mixture containing two or more of these compounds.

Generally speaking, it may be said that the above type of reactions involve the reaction of a compound having the following formula wherein $X_1$ and $X_2$ represent hydrogen, halogen, alkyl, aryl, or aralkyl groups, or the sulfonic acid radicals, and $A_1$ and $A_2$ represent hydroxyl, halogen, oxygen-alkyl, oxygen aryl, or $A_1$ and $A_2$ together represent oxygen, with a second compound capable of being polymerized and containing a single reactive group, or a system of non-conjugated reactive double bonds.

Illustrative of the polymer type of resins which may be produced in accordance with this invention may be mentioned those resins prepared by polymerization or condensation of reactive organic compounds such as olefines, including styrenes, isobutylene, and cyclopentene, diolefines, such as butadiene, isoprene, and cyclopentadiene, acrylic acid, esters of acrylic acid, and derivatives of acrylic acid or acrylic acid esters, methacrylic acid, esters of methacrylic acid, and derivatives of methacrylic acid or of methacrylic acid esters, unsaturated aldehydes, such as acrolein, crotonaldehyde, or furfuraldehyde, vinyl derivatives, such as vinyl chloride, vinyl ether, and vinyl esters, polyvinyl derivatives such as polyvinyl alcohol, polyvinyl esters, polyvinyl halides, or polyvinyl ethers, unsaturated ketones, such as vinyl methyl ketone, and the like.

A preferred method for the production of the maleic anhydride-unsaturated compound type of resins consists of gently heating the mixture of reactants until complete solution is attained, suitably at temperatures in the range of 30° to 100° C., followed by combining the reactants at a more elevated temperature suitably in the range of 100° to 200° C. and preferably in the range of 110° to 130° C. for the desired period of time.

The reaction time may be varied over very wide limits, the nature of the product obtained being directly dependent upon the length of the reaction time.

Illustrative of the problems encountered in the preparation of resins from materials which react exothermically, and of the advantages to be derived from effecting such reactions by the processes herein described, are given the following examples:

Example I

A mixture of 105 parts of monomeric styrene and 120 parts of maleic anhydride was placed in a reaction vessel equipped with a stirrer, refluxing facilities and temperature measuring means. The temperature of the reaction mass was slowly increased by circulating hot water around the reaction vessel accompanied with vigorous agitation of the reacting mixture. When the reaction mixture reached a temperature of 90° C. it was noticed that the reaction mixture became somewhat viscous. When the temperature of the reaction mixture reached 95° C., a vigorous exothermic reaction set in and the temperature of the mass rose rapidly thereafter. In an effort to control the temperature of the reaction mass, the reaction vessel was immersed in a cooling bath maintained at −20° C. but it was observed that the temperature within the reaction mass increased rapidly to a maximum temperature of 230° C. Thereafter, the reaction temperature dropped to approximately 150° C. at which point the cooling bath was removed from the reaction vessel. This resulted in a subsequent rapid increase in temperature within the vessel indicating the vigorous exothermic nature of the reaction.

The styrene-maleic anhydride resin obtained from the reaction vessel was quite hard and tough but of very poor quality, due to its non-homogeneous nature. Portions of the resinous mass were found to be deep brown in color while other portions were colorless. The unsatisfactory nature of this method of temperature control was thus clearly demonstrated.

Example II

The foregoing experiment using monomeric styrene and maleic anhydride was repeated in similar reaction equipment. In this experiment, however, a cooling bath consisting of a mixture of solid carbon dioxide and acetone, and having a temperature of approximately −80° C. was utilized to effect control of the exothermic reaction. It was found that even with a cooling bath maintained at this low temperature, the exothermic nature of the reaction could not be controlled, the reaction mixture reaching a maximum temperature of approximately 225° C. The material obtained from the reaction vessel after the completion of the reaction was of inferior quality, dark brown in color, and contained entrapped air bubbles.

The results of Experiments 1 and 2 indicate that the reaction of maleic anhydrides or other materials of this general class with unsaturated compounds cannot be carried out in the usual manner due to the highly exothermic nature of the reaction.

By use of the processes herein described a resinous product in the form of a thin film, entirely free of color and possessing superior physical properties was prepared, as shown by the following illustrative examples.

Example III

A mixture of 105 parts of monomeric styrene and 120 parts of maleic anhydride was heated to a temperature of approximately 90° C. in a reaction vessel equipped with heating coils and a stirrer. The mixture, at this temperature, was continuously applied to the surface of a moving metallic sheet in the form of a thin film, the temperature of the metallic sheet being maintained at 120° C. The exothermic reaction was found to be under careful control by keeping the metallic sheet at this temperature. The metallic sheet carrying the reaction material was subsequently cooled by contact with solid carbon dioxide.

The styrene-maleic anhydride resin was obtained in the form of clear, transparent, colorless sheets. This product was quite hard and possessed physical properties of a superior nature as compared with those obtained in Examples 1 and 2 above.

Where reference is made in the claims to an "acid" or to an "anhydride," it will be understood that this is for convenience and that unless otherwise qualified either term is intended to include within its scope either the acid, or its corresponding anhydride, or mixtures thereof.

The various methods of effecting polymerization in thin sheet or film form with adequate temperature control, as herein particularly described represent specific examples of applying the invention which is intended to be limited only as required by the prior art. Therefore, changes, omissions, additions, substitutions, and/or modifications may be made without departing from the spirit of the invention.

I claim:

1. A continuous process for the production of polymerization products in thin films from material which polymerizes exothermically comprising supplying said material in substantially unpolymerized state to a moving surface, causing said material to form a thin film on said surface, raising the temperature of said surface to initiate the requisite exothermic polymerization reaction, subsequently in the movement of said surface lowering the temperature thereof to retard the said reaction, and then stripping the resulting polymer film from said surface.

2. A continuous process for the production of polymerization products in thin films from material which polymerizes exothermically comprising supplying said material in substantially unpolymerized state to a moving surface, causing said material to form a thin film on said surface, raising the temperature of said moving surface to initiate the requisite polymerization reaction, transferring the reacting material from said moving surface to a second moving surface, lowering the temperature of said second moving surface to retard said reaction, and then stripping the resulting polymer film from said second surface.

3. A continuous process for the production of laminated products comprising a plurality of resinous films from material which polymerizes exothermically comprising supplying said material in substantially unpolymerized state to a plurality of moving surfaces, causing said material to form a thin film on each of said surfaces, controlling the temperature of each of said moving surfaces to initiate the requisite polymerization reaction, transferring the reacting material from each of said moving surfaces to a further moving surface, controlling the temperature of said further surface to effect lamination of said reacting material and to retard said polymerization reaction, and then stripping the resulting laminated product from said further moving surface.

4. A continuous process for the production of a resin comprising mixing maleic anhydride with a compound selected from a group consisting of styrene, methyl styrene and indene, said mixture being capable of reacting exothermically upon the application of heat, supplying said mixture to a moving surface, causing said mixture to form a thin film on said surface, heating said surface to initiate the requisite exothermic polymerization reaction of said mixture, subsequently in the movement of said surface cooling the same to retard said polymerization reaction, and then stripping the resultant polymer film from said surface.

5. In a continuous process for the production of resinous products in thin films from material which polymerizes exothermically, the steps which comprise conducting the polymerization reaction while passing the reaction material through the polymerization zone while in the form of a thin film applied to a moving surface in said zone, heating the moving surface near the point of introduction thereto of said material thereby to initiate the desired polymerization reaction with evolution of heat; and cooling the said moving surface containing the reacting material at a subsequent stage of its movement through said reaction zone whereby to retard the said exothermic polymerization reaction and prevent an excessive temperature rise in said material.

6. A process for the continuous production of polymer from material which polymerizes exothermically upon the application of heat, comprising initiating the polymerization of said material and causing an exothermic reaction therein by the application of heat, and abstracting sufficient heat from said material during said polymerization while said material is disposed in film form on a moving surface to maintain the temperature of said material below a predetermined level.

7. A process for the production of polymer from material which polymerizes exothermically upon the application of heat, comprising feeding said material onto a moving surface, promoting the polymerization of said material and producing an exothermic polymer-forming reaction therein while disposed in film form on said moving surface by the application of heat, and subsequently abstracting sufficient heat from said material while polymerizing in said film form on said moving surface to maintain the temperature of said material below a predetermined level.

8. A process for the production of polymer from material which polymerizes exothermically upon the application of heat, comprising passing said material through a reaction zone while disposed in film form on a moving surface, supplying heat to said material while in film form and during its passage through said reaction zone to promote the polymerization thereof with evolution of heat produced thereby, and subsequently removing sufficient heat from said material while reacting in film form on said moving surface to moderate the rate of said exothermic reaction and to maintain the temperature of said material below a predetermined level.

9. A process for the production of a resinous product from resin-forming material which reacts exothermically upon the application of heat, comprising disposing resin-forming material in film form on a moving surface, supplying heat to the reaction material while on said moving surface to promote the desired exothermic resin-forming reaction, and abstracting heat from said material while reacting in film form on said moving surface to dissipate excessive heat evolved during said reaction and to maintain said material below a predetermined temperature.

10. A process for the production of a resinous product from resin-forming material which polymerizes exothermically upon the application of heat, comprising applying the reaction material in a state capable of at least some polymerization to a moving surface, causing said material to assume a film form on said surface and to move therewith while said reaction progresses exothermically due to the application of heat, and abstracting heat from said material while reacting in film form on said moving surface to moderate the exothermic reaction and to maintain the temperature of said material below a predetermined level.

11. A process for the production of a resinous product from resin-forming material which reacts exothermically upon the application of heat, comprising disposing resin-forming material in film form on a moving surface having in contact therewith a material adapted to facilitate the removal of the reaction product from said moving surface, supplying heat to the reaction material while on said moving surface to promote the desired exothermic resin-forming reaction, and abstracting heat from said material while reacting in film form on said moving surface to moderate said exothermic reaction and to maintain the temperature of said material below a predetermined level.

12. A process for the production of a resinous polymer from monomeric unsaturated polymerizable material which reacts exothermically upon the application of heat to form a resinous polymer comprising depositing said monomeric polymerizable material as a thin film upon a moving surface, applying sufficient heat to said film upon said surface to initiate said exothermic resin-forming reaction, and abstracting sufficient heat from said reacting material while disposed in said film upon said moving surface to moderate said exothermic reaction and to maintain said reacting material below a predetermined temperature.

13. A process for the production of resinous polymerized styrene, comprising initiating the polymerization of reaction material containing styrene by the application of heat thereby producing an exothermic resin-forming reaction therein, and abstracting heat from said reacting material while disposed in film form on a moving surface to dissipate excessive heat evolved during said reaction and to maintain said material below a predetermined temperature.

FRANK J. SODAY.